United States Patent
Kuboyama et al.

(10) Patent No.: US 7,526,497 B2
(45) Date of Patent: Apr. 28, 2009

(54) DATABASE RETRIEVAL APPARATUS, RETRIEVAL METHOD, STORAGE MEDIUM, AND PROGRAM

(75) Inventors: Hideo Kuboyama, Kanagawa (JP); Makoto Hirota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 11/717,044

(22) Filed: Mar. 13, 2007

(65) Prior Publication Data
US 2007/0174261 A1 Jul. 26, 2007

Related U.S. Application Data

(62) Division of application No. 10/391,578, filed on Mar. 20, 2003, now Pat. No. 7,222,129.

(30) Foreign Application Priority Data

Mar. 29, 2002 (JP) ............... 2002-096179
Apr. 26, 2002 (JP) ............... 2002-127329

(51) Int. Cl.
    G06F 17/00 (2006.01)
(52) U.S. Cl. ............... 707/101; 707/102; 707/103 Y; 707/104.1
(58) Field of Classification Search ............... 707/3, 707/10, 101, 102, 103 R, 104.1; 710/56; 370/395.4; 711/114, 137
    See application file for complete search history.

(56) References Cited

U.S. PATENT DOCUMENTS 5,787,430 A 7/1998 Doeringer et al. ........... 707/100
5,978,812 A * 11/1999 Inokuchi et al. ............ 707/200
5,983,293 A * 11/1999 Murakami ................... 710/56

(Continued)

FOREIGN PATENT DOCUMENTS

EP 0268373 A2 * 10/1987

(Continued)

OTHER PUBLICATIONS

Anthony Tomasic et al., "Data Structures for Efficient Broker Implementation", ACM, Jul. 1997, pp. 223-253.*

(Continued)

*Primary Examiner*—Thuy N Pardo
(74) *Attorney, Agent, or Firm*—Fitzpatrick, Cella, Harper & Scinto

(57) ABSTRACT

It is an object of this invention to realize high-speed database retrieval. More specifically, it is an object of this invention to increase a retrieval speed when data corresponding to an input character string are retrieved from a database having a trie structure. In order to achieve the above object, a database retrieval apparatus according to the invention can retrieve data corresponding to an input character string from a database having a trie structure, and includes a plurality of child node search units for searching for a child node corresponding to the input character string at each node of the trie structure, and a setting unit for setting, in advance for each node, one of the plurality of child node search unit which is to be used at each node. Data held in the database is retrieved by searching for a child node using the child node search unit set for each node by the setting unit.

6 Claims, 20 Drawing Sheets

U.S. PATENT DOCUMENTS

| | | | |
|---|---|---|---|
| 6,003,115 A * | 12/1999 | Spear et al. | 711/137 |
| 6,078,913 A | 6/2000 | Aoki et al. | 707/2 |
| 6,144,969 A * | 11/2000 | Inokuchi et al. | 707/200 |
| 6,185,665 B1 * | 2/2001 | Owada et al. | 711/170 |
| 6,253,195 B1 | 6/2001 | Hudis et al. | 707/2 |
| 6,625,627 B2 * | 9/2003 | Haneda | 707/205 |
| 6,662,180 B1 | 12/2003 | Aref et al. | 707/6 |
| 6,711,562 B1 | 3/2004 | Ross et al. | 707/3 |
| 6,738,759 B1 | 5/2004 | Wheeler et al. | 707/3 |
| 6,947,952 B1 | 9/2005 | Welch et al. | 707/104.1 |
| 7,215,675 B2 * | 5/2007 | Kramer et al. | 370/395.4 |
| 7,216,199 B2 * | 5/2007 | Mizuno | 711/114 |
| 2002/0064311 A1 | 5/2002 | Yahagi | 382/224 |
| 2002/0147721 A1 | 10/2002 | Gupta et al. | 707/100 |
| 2003/0084031 A1 | 5/2003 | Tarquini | 707/3 |
| 2003/0187877 A1 | 10/2003 | Kuboyama et al. | 707/104.1 |
| 2005/0033733 A1 | 2/2005 | Shadmon et al. | 707/2 |
| 2005/0177563 A1 | 8/2005 | Bellamy et al. | 707/3 |
| 2006/0173905 A1 | 8/2006 | Lahey et al. | 707/102 |
| 2006/0173959 A1 | 8/2006 | McKelvie et al. | 709/204 |

FOREIGN PATENT DOCUMENTS

| | | |
|---|---|---|
| JP | 11-203286 | 7/1999 |
| JP | 2000-035965 | 2/2000 |

OTHER PUBLICATIONS

Chao Huang et al., "High-Level Synthesis of Distributed Logic Memory Architectures", ACM, 2002, pp. 564-571.*

Gopal Gupta et al., "Paralell Execution of Prolog Programs: A Survey", ACM, Jul. 2001, pp. 472-602.*

Peter Scheuermann et al., "Data Partitioning and Load Balancing in Parallel Disk Systems", ACM, 1998, pp. 48-66.*

Kondo, Yoshiyuki, "Algorithms and Data Structures for C Programmers", Softbank Books, pp. 108-109 and 130-131.

Makoto Nagao, "Natural Language Processing", Japan, The Iwanami Software Science Series, Apr. 26, 1996, vol. 1, pp. 243-253.

Japanese Office Action in corresponding Japanese Application No. 2002-127329, dated Apr. 14, 2008.

Japanese Office Action in corresponding Japanese Application No. 2002-096179, dated Apr. 18, 2008.

Japanese Office Action dated Jul. 18, 2008 in corresponding Japanese Application No. 2002-127329.

* cited by examiner

FIG. 4

| | 403 | | 401 |
|---|---|---|---|
| | | | 6 |
| NODE 0 | 1 | 0 | 3 |
| 1 | 0 | 25 | 2 |
| 2 | 1 | 35 | 3 |
| 3 | 0 | 60 | 2 |
| 4 | 0 | 70 | 2 |
| 5 | 0 | 80 | 1 |
| 6 | | 24 | 1 |
| 7 | | 56 | 3 |
| 8 | | 80 | 1 |
| 9 | | 120 | 2 |
| 10 | | 144 | 1 |
| 11 | | 168 | 1 |
| 12 | | 192 | 1 |
| 13 | | 213 | 2 |

402 — (rows 0–5) — 404
405 — (rows 6–13) — 406

FIG. 5

| | | |
|---|---:|---:|
| 501 | | 3 |
| HASH VALUE 0 | 10 | 2 |
| 1 | 20 | 0 |
| 502 — 2 | 20 | 1 |
| A | | 1 |
| 503 — D | | 2 |
| H | | 5 |

FIG. 6

| B | | | 6 |
|---|---|---|---|
| C | | | 7 |

DATA LENGTH IS NOT ALWAYS CONSTANT

FIG. 8

| | | |
|---|---:|---:|
| | | 2 |
| HASH VALUE 0 | 20 | 1 |
| 1 | 30 | 2 |
| | φ | 8 |
| | E | 3 |
| | G | 4 |

FIG. 9

| φ | 9 |
|---|---|
| F | 10 |

FIG. 12

|  | 1201 | 1202 | 1203 | 1204 | 1205 |
|---|---|---|---|---|---|
| NODE 0 | 1 | 0 | 3 | 0 | 0 |
| 1 | 0 | 25 | 2 | 0 | 0 |
| 2 | 0 | 35 | 2 | 80 | 1 |
| 3 | 0 | 60 | 1 | 120 | 2 |
| 4 | 0 | 70 | 2 | 0 | 0 |
| 5 | 0 | 80 | 1 | 0 | 0 |
| 6 | 0 | 0 | 0 | 24 | 1 |
| 7 | 0 | 0 | 0 | 56 | 3 |
| 8 | 0 | 0 | 0 | 144 | 1 |
| 9 | 0 | 0 | 0 | 168 | 1 |
| 10 | 0 | 0 | 0 | 192 | 1 |
| 11 | 0 | 0 | 0 | 213 | 2 |

FIG. 14

| 1401 | 1402 | 1403 |
|---|---|---|
| A | 100 | ... |
| B | 1500 | ... |
| C | 400 | ... |
| D | 1300 | ... |
| E | 900 | ... |
| ⋮ | ⋮ | ⋮ |

INDEX  CUMULATIVE SIZE  ADDRESS

FIG. 20

| INDEX (1401) | SIZE (2001) | RETRIEVAL FREQUENCY (2002) | ADDRESS (1403) |
|---|---|---|---|
| A | 100 | 50000 | ... |
| B | 200 | 12200 | ... |
| C | 300 | 38000 | ... |
| D | 400 | 18400 | ... |
| E | 500 | 22100 | ... |
| ⋮ | ⋮ | ⋮ | ⋮ |

DATABASE RETRIEVAL APPARATUS, RETRIEVAL METHOD, STORAGE MEDIUM, AND PROGRAM

This application is a divisional of application Ser. No. 10/391,578, filed Mar. 20, 2003, now allowed, the contents of which are incorporated by reference herein.

FIELD OF THE INVENTION

The present invention relates to a database retrieval apparatus and retrieval method which use a character string or the like as a key to retrieve requested data from a database which stores data corresponding to the key.

BACKGROUND OF THE INVENTION

Recently, natural language processing, and more specifically, morphemic analysis, has been applied to advanced document retrieval and the like. For this purpose, large quantities of sentences must be morphemically analyzed, and hence demands have arisen for an increase in the speed of morphemic analysis. In dictionary retrieval in morphemic analysis, word data corresponding to a character string are retrieved from an enormous number of words. This operation occupies much of the processing time. In addition to dictionary retrieval in natural language processing, it takes much processing time to retrieve desired information from a database in various database retrieval operations as the database increases in size. As the information-oriented society continues to evolve, in particular, it becomes easy to acquire information. On the other hand, as databases grow excessively, it takes much time to retrieve information.

Under the circumstances, there have been increasing demands for means for retrieving information from databases (including language dictionaries) at high speed.

Approaches for realizing high-speed database retrieval can be roughly classified into two types. The first is a software approach of realizing high-speed retrieval by devising a retrieval algorithm. The second is a hardware approach of increasing the processing speed by effectively using hardware resources.

A practical example of the first approach will be described in detail below. The trie method is regarded as an effective retrieval algorithm in database retrieval. This method uses a kind of tree structure. According to the method, state transitions are made by using the respective characters of a character string as search keys, starting from the head of the string, to track data. This is a high-speed retrieval method capable of acquiring all data matching the character string from the head of the string by one scanning operation.

In order to make a transition from the root node of a tree structure to a child node corresponding to a search key, a search is made for a transition key matching the search key from a set of transition keys associated with child nodes. A transition is then made to the child node corresponding to the matched transition key. After the state transition, the next character of the character string is used as the next retrieval key to perform the same processing as described above.

This trie method is known as a high-speed retrieval method, and more specifically, an effective method for dictionary retrieval in language analysis. In practice, however, the processing speed is influenced by the manner of searching for child nodes at the respective nodes, the structure of a database, and the like. If, for example, child nodes are set at the character code positions of transition keys in the arrays of a database to increase the speed of processing for searches for child nodes at the respective nodes, a child node having a transition key matching a search key can be tracked in a short period of time. In this case, however, since an array corresponding to the size of a character code must be prepared at each node, the database becomes very large. This method is therefore not feasible.

In practice, therefore, transition keys and a set of child nodes corresponding to the transition keys are stored in advance in arrays equal in number to the child nodes, and a search for a transition key matching a search key is made in array number order or a search method such as the hash method or binary search method is used to search for a child node corresponding to the search key. The trie structure, hash method, and binary search method are disclosed in Yoshiyuki Kondo, "Algorithms and Data Structures for C Programmers" (SOFTBANK BOOKS) and the like.

A practical example of the second approach will be described in detail next. As an effective method of increasing processing speed in retrieving information from a database such as a language dictionary at high speed, a method of loading the database from the disk into the memory in advance and always retrieving information from the database held on the memory has been proposed. This method eliminates the necessity of cumbersome operation of loading the database from the disk for every retrieval, and can increase the processing speed, thus realizing high-speed retrieval.

Both the above two approaches, however, involve several problems. In the first approach, for example, the above child node search methods, i.e., the hash method and binary search method, have their own characteristics, which are not always suitable for searches for child nodes at all nodes. More specifically, when there are many child nodes, the binary search method is faster than the method of searching for a child node in array number order. It, however, takes much processing time because a transition must be repeated many times to check the match between a search key and a transition key.

In contrast to this, in the hash method, a hash value is obtained by a hash function to perform a search. This method allows a fast search when there are many child nodes. If, however, the number of keys is small, the binary search method, which is simple in terms of processing, allows a faster search than by calculating a hash function and searching a table in which hash values are arrayed.

As described above, optimal search methods at the respective nodes in a trie structure differ depending on the number of child nodes. For this reason, in order to maximize the search speed, therefore, optimal search methods are preferably selected for the respective nodes.

With regard to the second approach, if many data are registered in a database or the size of each data is large, the size of the database to be held on the memory becomes excessive. This may lead to a difficulty in holding all the data.

Furthermore, database users are in various hardware environments. Some users can prepare memories large enough to hold a large database, and demand fastest retrieval (high-speed retrieval), whereas other users cannot prepare sufficient memories and hence require fastest retrieval within a range in which the memory consumption can be minimized (memory-saving retrieval).

That is, users have different needs depending on hardware environments for database retrieval.

SUMMARY OF THE INVENTION

The present invention has been made in consideration of the above problems, and has as its object to realize high-speed database retrieval.

More specifically, it is the first object of the present invention to increase a retrieval speed when data corresponding an input character string are retrieved from a database having a trie structure.

It is the second object of the present invention to realize both high-speed database retrieval and memory-saving retrieval, in a database retrieval apparatus which loads a database into the memory and retrieves data therefrom, by loading an optimal database in accordance with the needs of a user.

In order to achieve the first object, a database retrieval apparatus according to the present invention has the following arrangement.

There is provided a database retrieval apparatus which retrieves data corresponding to an input character string from a database having a trie structure, characterized by comprising:

a plurality of child node search means for searching for a child node corresponding to the input character string at each node of the trie structure; and setting means for setting, in advance for each node, one of the plurality of child node search means which is to be used at each node, wherein data held in the database is retrieved by searching for a child node using the child node search means set for each node by the setting means.

In order to achieve the second object, a database retrieval apparatus according to the present invention has the following arrangement.

There is provided a database retrieval apparatus which performs retrieval processing for data stored in a database, characterized by comprising:

storage means for dividing the database into a plurality of blocks and storing the blocks;

determination means for determining a combination of the blocks on the basis of retrieval priority levels and data sizes of the respective blocks such that a total sum of the data sizes of the blocks becomes smaller than a predetermined data size;

loading means for loading the determined blocks;

memory means for temporarily storing the loaded blocks to perform retrieval processing for a database of the loaded blocks; and output means for outputting data having undergone retrieval processing.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a view showing a management table;

FIG. 5 is a view showing a transition table used in a hash search;

FIG. 6 is a view showing a transition table used in a binary search;

FIG. 8 is a view showing a transition table which contains a φ node and is used in a hash search;

FIG. 9 is a view showing a transition table which contains a φ node and is used in a binary search;

FIG. 12 is a view showing a management table;

FIG. 14 is a view showing index information;

FIG. 20 is a view showing index information.

DETAILED DESCRIPTION OF THE PREFERRED EMBODIMENTS

Preferred embodiments of the present invention will now be described in detail in accordance with the accompanying drawings.

First Embodiment

An embodiment of the present invention will be described in detail below with reference to the accompanying drawings.

Figure 1:
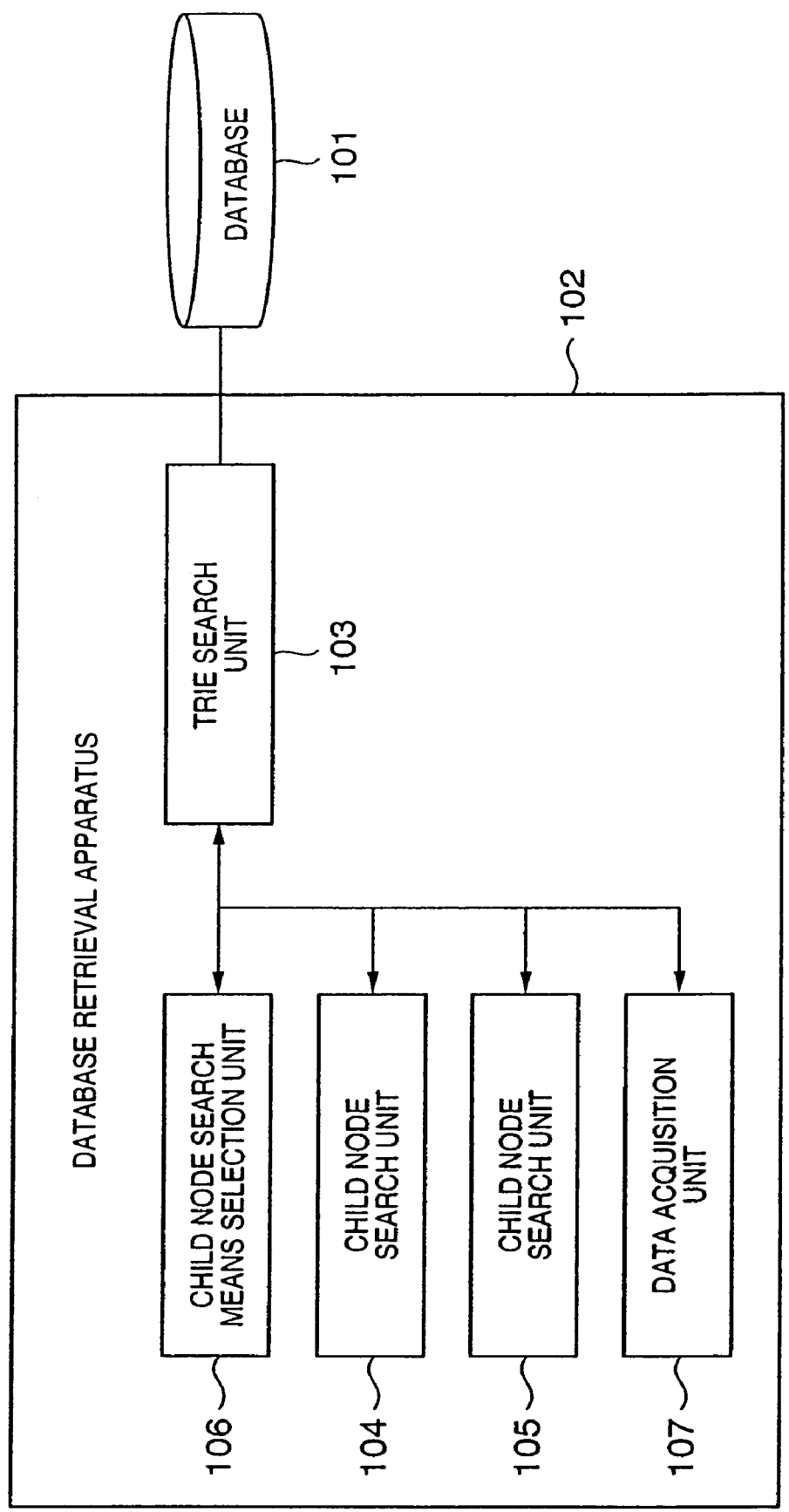
FIG. 1 is a block diagram of a database retrieval apparatus according to an embodiment of the present invention.

FIG. 1 is a block diagram of a database retrieval apparatus according to an embodiment of the present invention. Referring to FIG. 1, reference numeral 101 denotes a database in which data to be retrieved are stored in a trie structure; and 102, a database retrieval apparatus which inputs a character string and retrieves and extracts data corresponding to the character string from the database 101.

Reference numeral 103 denotes a trie search unit 103 which searches for data by performing a state transition of the trie structure in the database retrieval apparatus; and 104 and 105, child node search units which inform the trie search unit of the next state transition destination by using one character of a character string as a search key. The child node search units 104 and 105 use different search schemes or parameters. Assume that in this embodiment, the child node search unit 104 uses a hash search scheme, whereas the child node search unit 105 uses a binary search scheme.

Reference numeral 106 denotes a child node search means selection unit which selects one of the different child node search units 104 and 105 which is suitable for a state wherein the trie search unit 103 performs a search; and 107, a data acquisition unit which acquires data from the database at the time point the trie search unit 103 makes a search up to the data.

Figure 2:
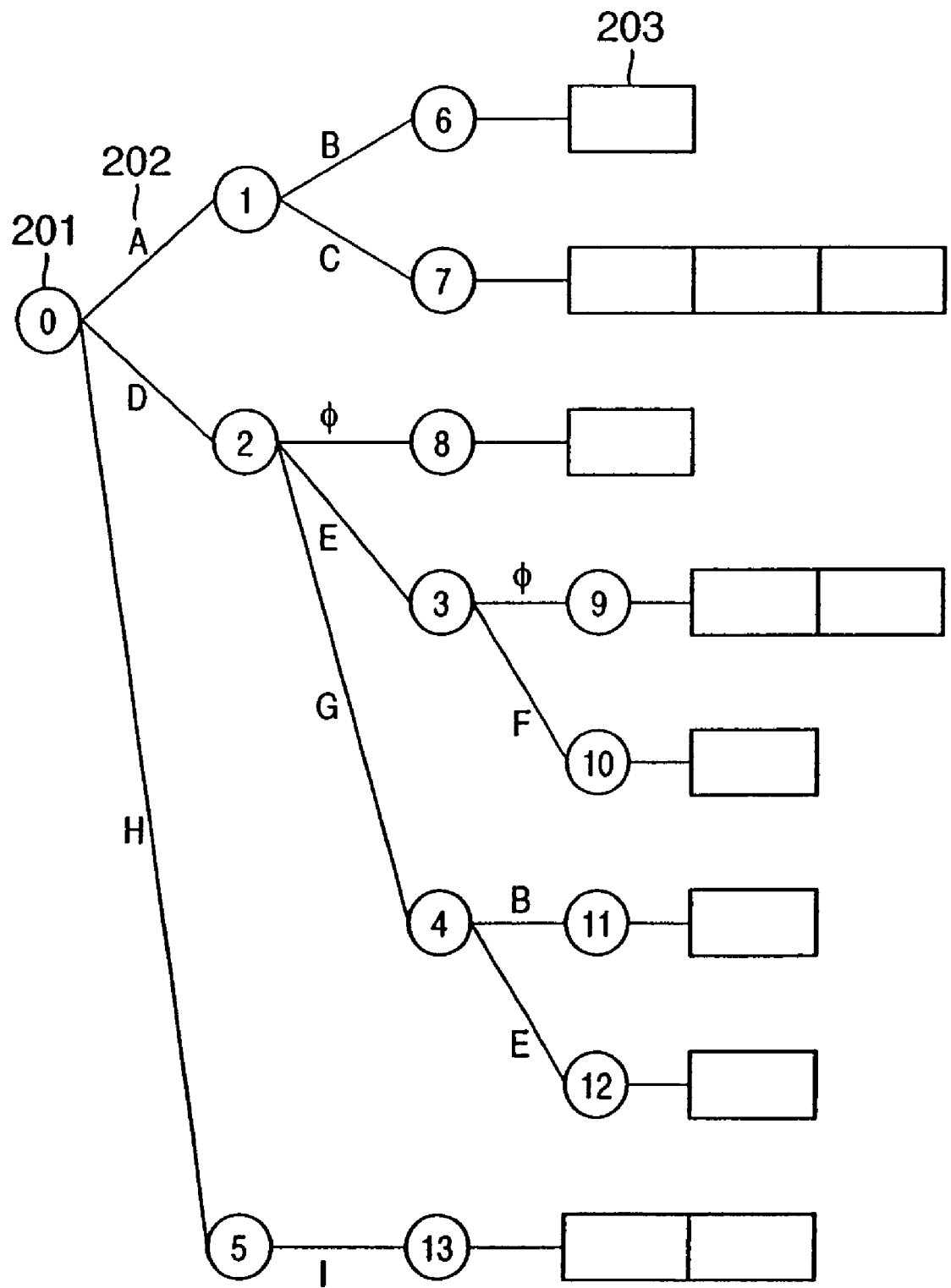
FIG. 2 is a view showing the trie structure of a database.

FIG. 2 is a conceptual view showing a trie structure which is a characteristic feature of the database 101. Reference numeral 201 denotes each state in the trie structure, to which a node number is assigned; and 202, a transition key for making a transition from a node to a child node. The transition key "φ" is a special key which is prepared for the sake of convenience to make a node which has the next transition destination (child node) and data at a transition position to the node have a child node at the transition destination. A transition is unconditionally made to this child node regardless of the value of a search key. This child node will be referred to as a φ node. Reference numeral 203 denotes data stored in the database.

Figure 3:
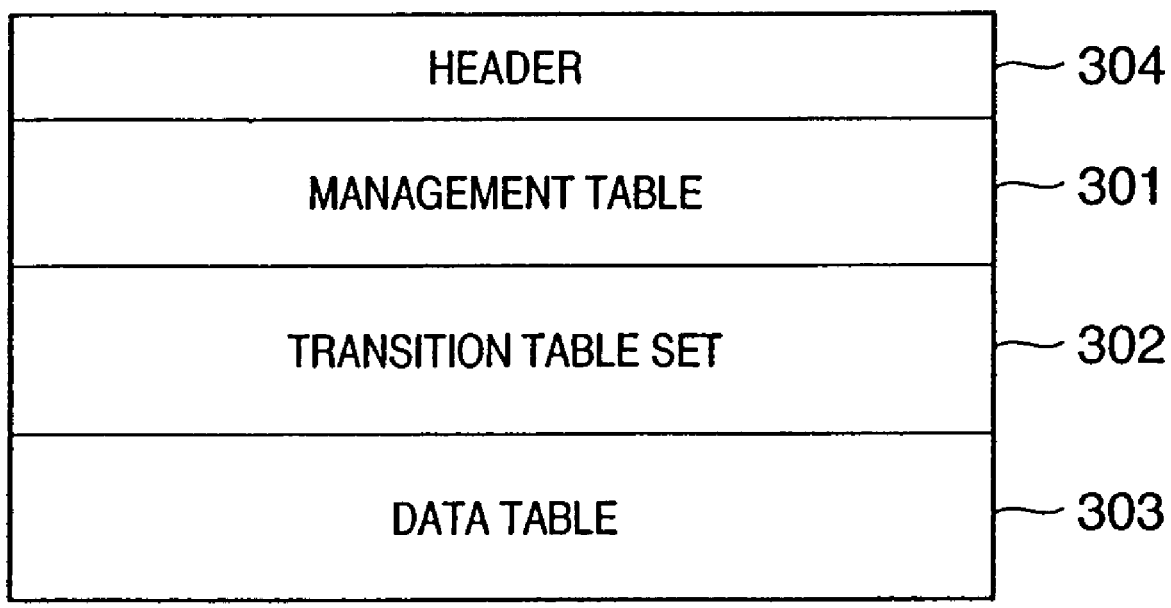
FIG. 3 is a view showing the arrangement of the database.

FIG. 3 is a view showing a data structure for implementing the database 101. Referring to FIG. 3, reference numeral 301 denotes a management table in which the addresses and sizes of the respective nodes and data are written; and 302, a transition table set in which transition keys and transition destinations are written at the respective nodes. Each node which has a state transition destination has a transition table. Reference numeral 303 denotes a data table as a set of data to be searched out; and 304, a header in which the start addresses of the management table 301, transition table set 302, and data table 303 are written.

FIG. 4 is a view showing the data structure of the management table 301. Referring to FIG. 4, reference numeral 401 denotes the number of nodes which have child nodes; and 402, a child node search means flag for indicating a specific one of a plurality of child node search units (104, 105) which is to be used to search for a transition key. In this embodiment, the child node search means flag "1" indicates the child node search unit 104 using the hash search scheme, whereas the child node search means flag "0" indicates the child node search unit 105 using the binary search scheme.

Reference numeral 403 denotes an address designating the transition table of a node; 404, the number of child nodes to which a transition can be made from the node; 405, an address to data obtained from the node; and 406, the number of data obtained from the node. As nodes, nodes each having a child node which can make transitions to node numbers smaller than the value of the number 401, and nodes each having data at a node number equal to or larger than the value of the number 401 are assigned.

Figure 5:
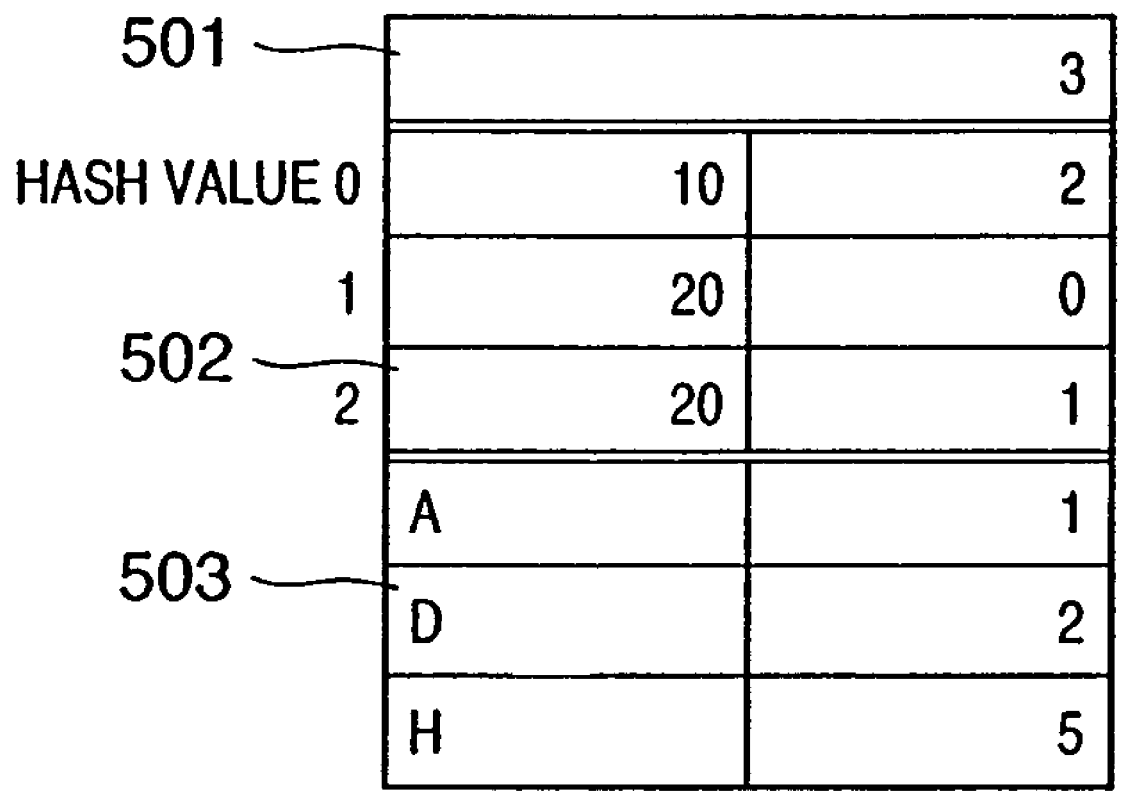

FIG. 5 is a transition table for making a transition to a child node by using the child node search unit 104 based on the hash search scheme. Referring to FIG. 5, reference numeral 501 denotes a hash size in which the number of hash arrays is written; 502, a hash value table in which the addresses and sizes of transition keys having hash values are stored. Each column of the hash value table corresponds to a hash value. Each value on the left side of the table indicates a relative address from the start address of the transition table, and each value on the right side indicates the number of transition keys each having a hash value in a corresponding one of the columns. Reference numeral 503 denotes a child node table in which transition keys are associated with child nodes.

Figure 6:
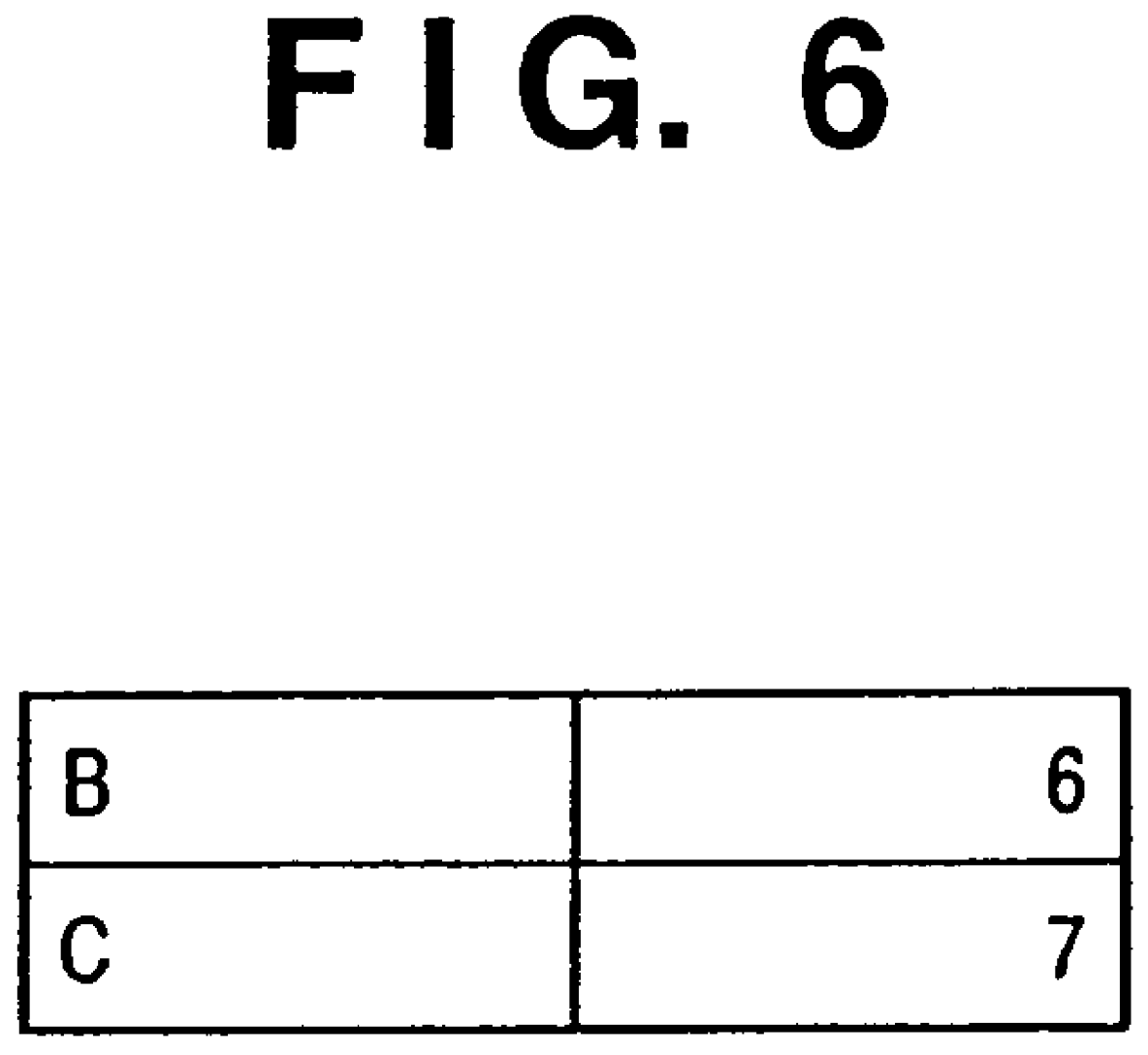

FIG. 6 is a transition table for making a transition to a child node by using the child node search unit 105 based on the binary search scheme. The values on the left side of the table are transition keys, and child nodes associated with the transition keys are written on the right side.

Figure 7:
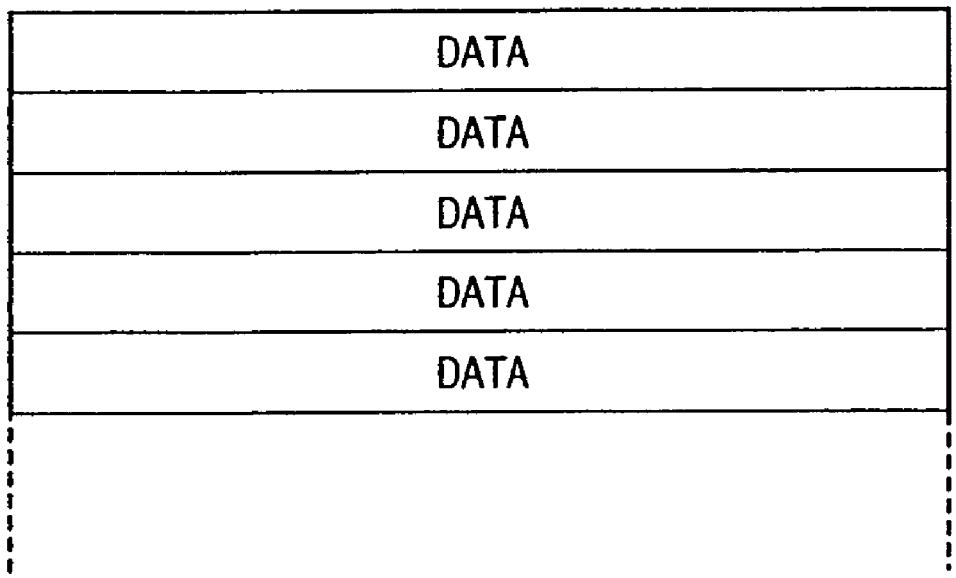
FIG. 7 is a view showing a data table.

FIG. 7 is a view showing a data table in which data stored in a database are stored. The respective data are continuously juxtaposed, and each data is looked up by the address 405 of the data in the management table.

Database retrieval in the present invention will be described next with reference to FIGS. 2 to 7.

The character string "ABC" is input to the database having the trie structure shown in FIG. 2. A search starts from node 0 which is the root of the trie structure. The management table shown in FIG. 4 is looked up from the address of the management table which is written in the header 304 of the database.

By referring to node 0 in the management table, the address 403 of a transition table (whether the address indicates a transition table or data can be determined from the number 401 of nodes having child nodes in the management table), the number 404 of child nodes, and the child node search means flag 402 can be looked up. In this case, the address 403 of the transition table is an address from the start address (which can be looked up from the header 304) of the transition table set 302 in FIG. 3. The transition table of node 0 is tracked along this address. According to the management table, the transition table of node 0 is based on the hash method, a transition table for hashing like the one shown in FIG. 5 is invoked from the database.

In this case, the child node search means selection unit 106 transfers the transition table to the child node search unit 104 designed to perform a search by the hash method, and the child node search unit 104 performs a search. First of all, the child node search unit 104 checks the presence/absence of φ node. The child node search unit 104 checks whether the first transition key stored in the child node table 403 is φ key. Since no φ node exists at node 0, the flow of processing advances further. When a preset hash function is calculated by using the search "A", which is the first character of the input character string, as a character code, a hash value of 0 is obtained. When a hash value of 0 is referred to in the hash value table 502, it is known that two transition destinations are stored at an address 10 bytes ahead of the transition table. A comparison with the search key "A" is sequentially performed from this address, and the search key matches the transition key "A" at first, thereby making a transition to node 1.

In the case of node 1, when the management table is referred to in the same manner, since node 1 is a transition table for a binary search, a binary search transition table like the one shown in FIG. 6 in which transition keys are arranged in the order of character codes is referred to. The child node search means selection unit 106 transfers the transition table to the child node search unit 105 designed to perform a search by the binary search scheme. The child node search unit 105 then performs a search. In this case as well, first of all, the presence/absence of a φ node is checked. Since there is no φ node, a search is performed by the binary search scheme using the next input character "B" as a search key.

In both cases wherein the array size of the transition table is even (2n) and odd (2n+1), a key corresponding to a median array number n is referred to. If the value of the character code of the search key is larger than the transition key, arrays equal to or less in value than the transition key are excluded from the candidates, and the median value is referred to again. If the value of the character code of the search key is smaller than the transition key, arrays equal to or larger in value than the transition key are excluded from the candidates, and the median value is referred to again. This scanning operation is continued until a transition key matching the search key is found or no candidate is left.

By the above binary search, node 6 is obtained as the next transition destination. According to the management table, node 6 is a node having data, and one data exists at the 24th byte of the address of the database. The data acquisition unit 107 acquires this data from the data table shown in FIG. 7. Since there is no next transition destination, it is known that no data exists which matches the next character "C" of the character string, and only data corresponding to "AB" are obtained. The retrieval is then finished.

Figure 8:
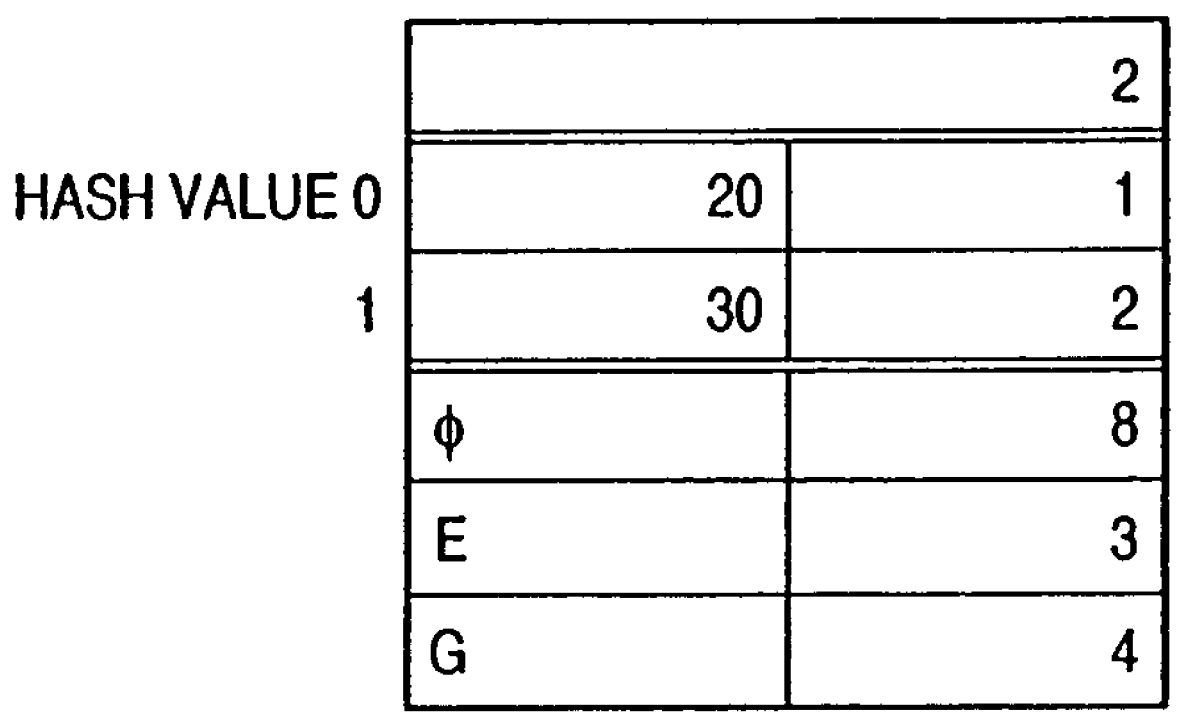

When the character string "DED" is input, retrieval is performed in the same manner as described above. At node 2, a φ node exists at the transition designation, as shown in FIG. 8. At this time, a transition is made to node 8 as the transition designation of the φ node before a hash value is calculated, and the data acquisition unit 107 acquires data corresponding to the character "D". The flow of processing returns to node 2, at which a hash search is performed by using the character "E" as a search key, and a transition is made to node 3.

Figure 9:
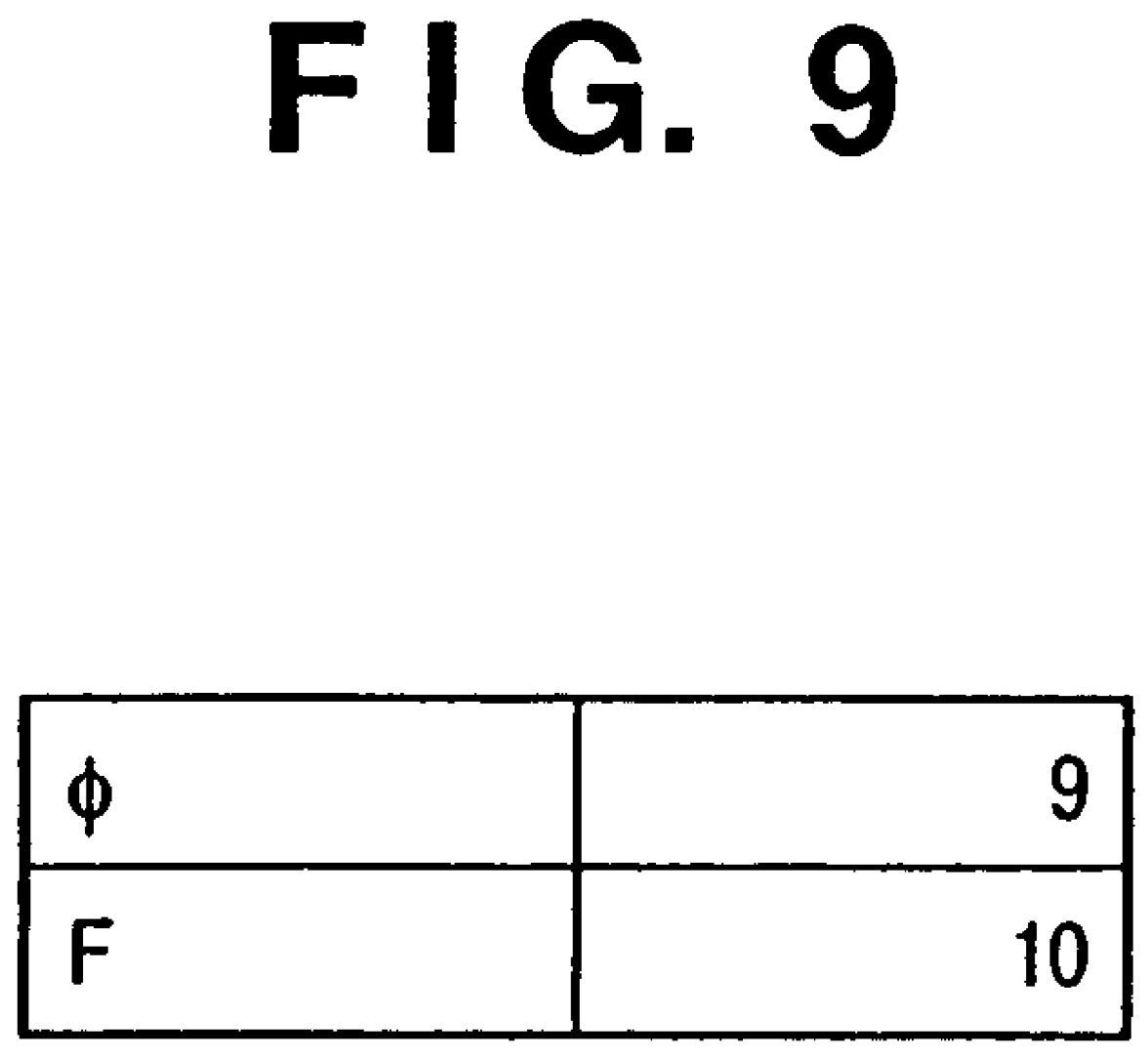

In a binary search at node 3 as well, since a φ node exists as shown in FIG. 9, a transition is made first to node 9, and the data acquisition unit 107 acquires data corresponding to the character string "DE". The flow of processing then returns to node 3 to perform a binary search with respect to transition keys except for φ so as to search for a child node at the transition destination. In this case, only the transition key "F" exists, and the search key is the third character "D" of the character string "DED". Therefore, these keys do not match each other, and the search is terminated.

In the above description, the child node search means flag 402 is set for each node at the time of the creation of a dictionary. As described above, optimal child node search methods differ at the respective nodes of a trie structure. In consideration of this characteristic, this device is configured to allow optimal child node search methods to be set for the respective nodes, thereby increasing the check speed. In this embodiment, the child node search units 104 and 105 respectively use the hash search algorithm and binary search algorithm as algorithms used for searches. In this case, a method of using the number of child nodes connected to a given mode as a threshold for selective use can be effectively used.

This is because the hash search scheme can perform a search at high speed when the number of child nodes is large, but when the number of child nodes is small, the binary search scheme can simply perform a search at higher speed by tacking the transition table in FIG. 6 than by calculating a hash function, searching the hash value table 502 for an address corresponding to the hash value, and tracking the child node table 503.

Figure 10:
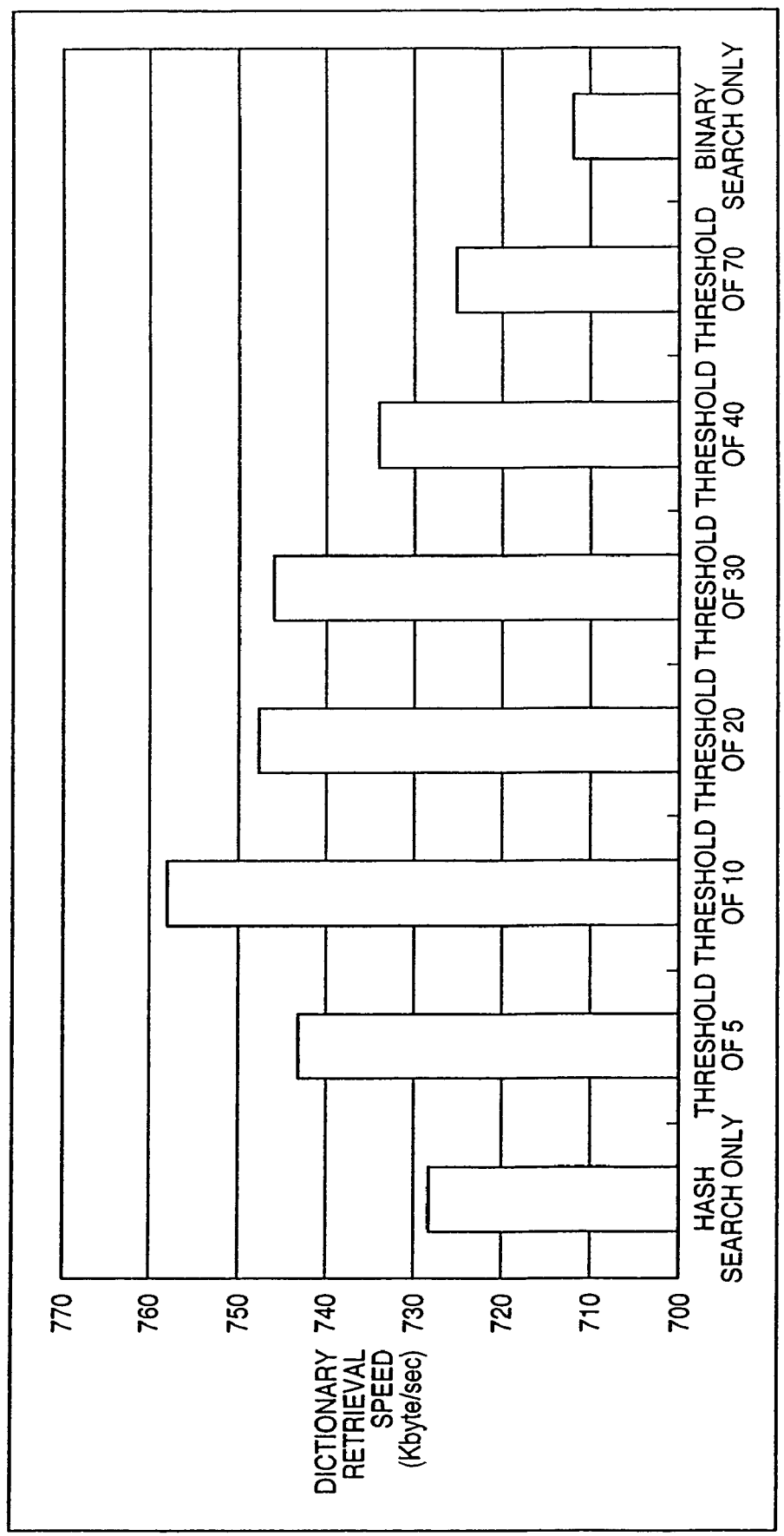
FIG. 10 is a graph showing the experimental results of dictionary retrieval speeds obtained by setting a child node search means flag to various thresholds.

FIG. 10 shows dictionary retrieval speeds (which are not based on dictionary retrieval alone because the operation includes, for example, extracting one sentence from a document) experimentally obtained by applying the present invention to a certain language dictionary. Experimental conditions are arranged along the abscissa. A hash search is performed with respect to a node having child nodes equal to or larger in number than a threshold, whereas a binary search is performed with respect to a node having child nodes less in number than the threshold. The ordinate represents the speed.

As is obvious from this graph obtained by the preliminary experiment, the maximum efficiency is obtained with a threshold of 10 in this embodiment. It is therefore effective that a database is created such that the child node search means flag 402 is set to 0 to indicate a binary search with respect a node having less than 10 child nodes, and is set to 1 to indicate a hash search with respect to a node having 10 or more child nodes. However, the present invention is not limited to this. Another threshold may be set, or a child node search unit may be selected for each node with reference to another factor other than the number of child nodes.

Second Embodiment

In the above embodiment, the two child node search units are prepared: the child node search unit 104 based on the hash search scheme and the child node search unit 105 based on the binary search scheme, and the child node search means selection unit 106 selects one of these child node search units for each node on the basis of the child node search means flag 402, thereby searching for a child node at a transition destination. However, the present invention is not limited to this. For example, the present invention may use a simple search method of sequentially scanning arrays in which transition keys and child nodes are arrayed, or another method. In addition, a child node search unit based on the same technique may be held with different parameters (e.g., hash functions). Furthermore, the number of child node search units is not limited to two as long as it is plural.

Third Embodiment

In the above embodiments, the child node search means flag 402 contained in the database indicates a specific one of child node search units, and the child node search means selection unit 106 selects a child node search unit by referring to this flag. However, the present invention is not limited to this. For example, the child node search means flag may be made to have some kind of parameter such as the number of child nodes or the size of data, and a child node search unit to be selected by the child node search means selection unit may be determined with reference to the parameter as a determination criterion.

In this case, various thresholds can be adjusted on the database retrieval apparatus side with respect to even the same database. However, this embodiment can applied to only a case wherein a plurality of child node search units are based on the array-sequence search scheme and binary search scheme or transition tables have the same arrangement with, for example, different parameters.

When a child node search unit to be selected by the child node search means selection unit is determined with reference to the number of child nodes, since a management table contains the number of child nodes as information 404, no child node search means flag is required.

Fourth Embodiment

In the above embodiments, all data matching any of the characters of an input character string, starting from the first character, are acquired. When, for example, "DEF" is input to a database having the trie structure shown in FIG. 2, data corresponding to "D", data corresponding to "DE", and data corresponding to "DEF" are all acquired. However, the present invention is not limited to this. For example, only data exactly matching "DEF" may be acquired.

Fifth Embodiment

The present invention is not limited to the formats of a database, management table, transition table, and data table described in the above embodiments. Any formats can be used as long as the functions described in the above embodiments can be implemented.

In the above embodiments, a φ node which makes a transition to acquire data without any comparison with input characters is prepared to discriminate a node having a state transition destination and a node having data in a trie structure. However, the present invention is not limited to this, and data may be linked to a node having a child node without preparing any φ node.

Figure 11:
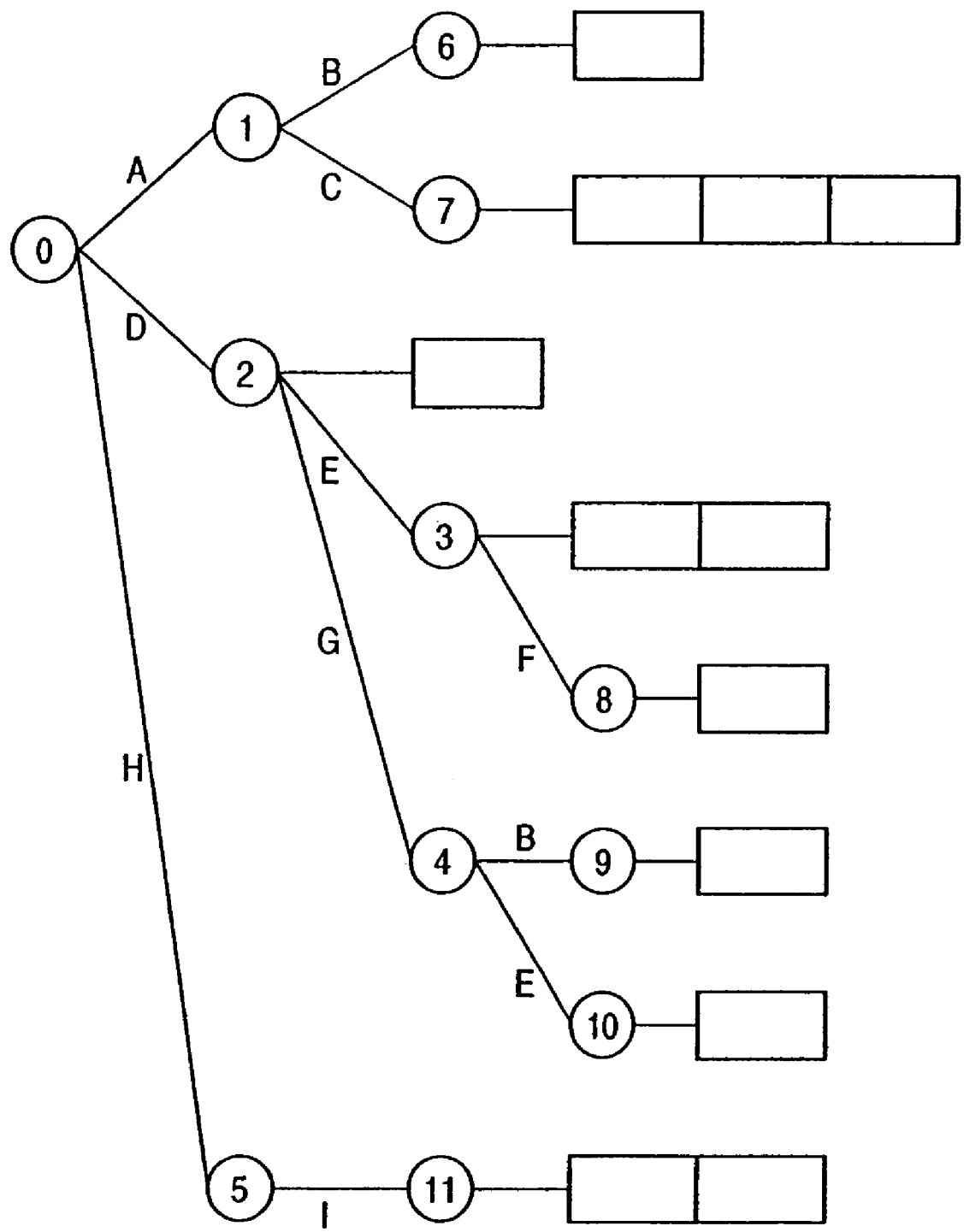
FIG. 11 is a view showing the trie structure of a database.

In this case, the trie structure shown in FIG. 2 is modified into the one shown in FIG. 11. In this case, each node can have a child node and data. For this reason, a management table needs to be designed as shown in FIG. 12. Referring to FIG. 12, reference numeral 1201 denotes a child node search means flag; 1202, the address of a transition table; 1203, the number of child nodes; 1204, the address of data, and 1205, the number of data linked to a node.

Referring to FIG. 12, at each node, first of all, the number 1205 of data linked to the node is checked. If any data is linked to the node, the data is obtained by referring to the address 1204 of the data. The number 1203 of child nodes is then checked. If there is no child node, the search is terminated. If there is any node, a child node search unit to be used is determined in accordance with the child node search means flag 1201, and a search for a key is made by referring to the address 1202 of the transition table.

Sixth Embodiment

Figure 13:
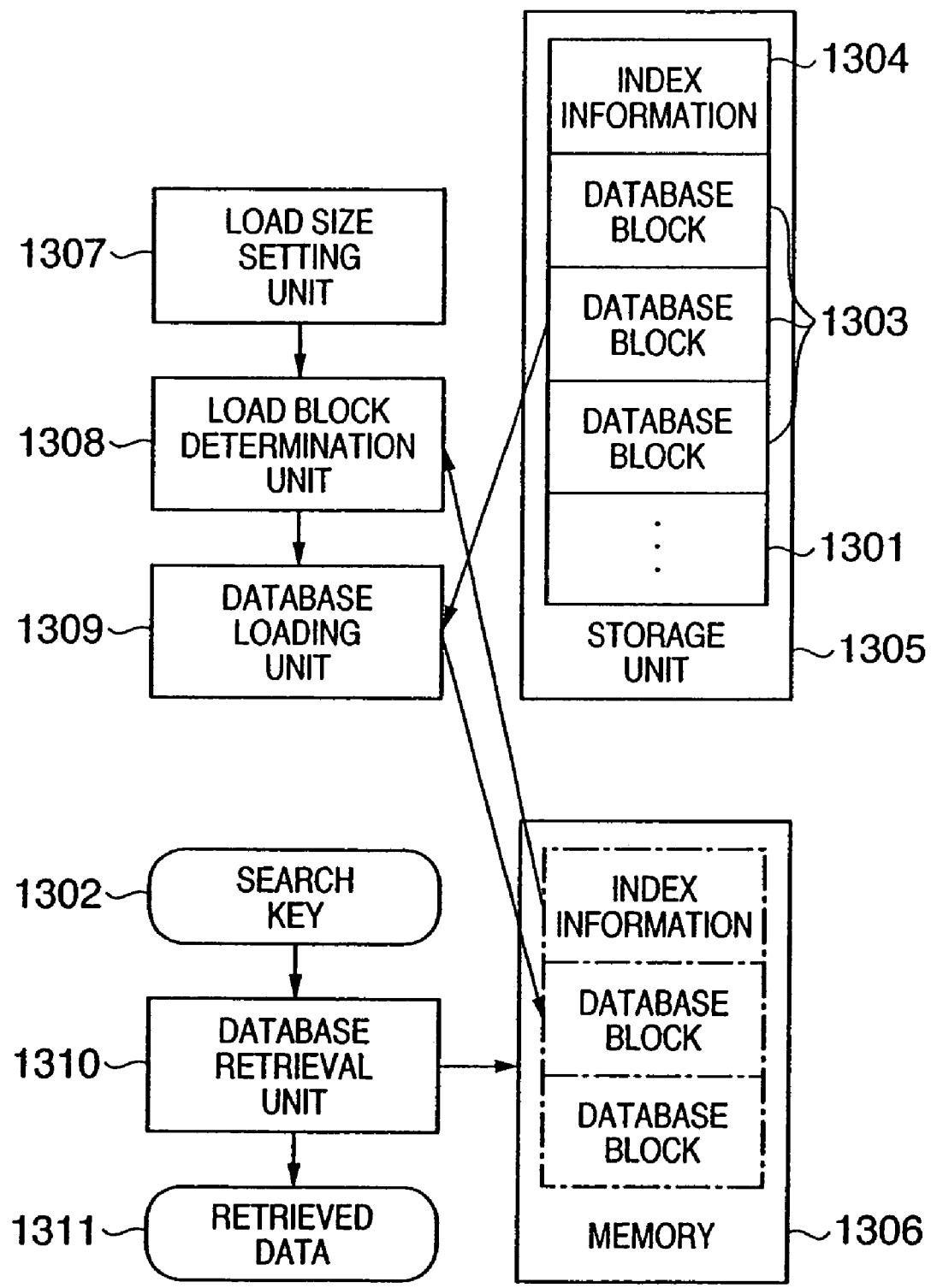
FIG. 13 is a block diagram showing the arrangement of a database retrieval apparatus according to an embodiment of the present invention.

FIG. 13 is a view showing the arrangement of a database retrieval apparatus according to an embodiment of the present invention. Referring to FIG. 13, reference numeral 1301 denotes a database which the database retrieval apparatus searches for data; 1302, a search key to be input by a user to extract desired data from the database 1301; 1303, database blocks divided from the database 1301; 1304, index information including information indicating a specific one of the database blocks 1303 in which the information of the search key 1302 is contained or the address at which the data block exists; and 1305, a storage unit such as a hard disk in which the database 1301 is stored.

Reference numeral 1306 denotes a memory which can be referred to faster than the storage unit 1305 and in which the database blocks 1303 are loaded from the storage unit.

Reference numeral 1307 denotes a load size setting unit by which the user of the database retrieval apparatus sets the upper limit of the sizes of data blocks to be loaded from the database block 1303 into the memory 1306.

Reference numeral 1308 denotes a load block determination unit for determining a specific one of the database blocks 1303 which is to be loaded from the database 1301 into the memory 1306 within the size set by the load size setting unit 1307.

Reference numeral 1309 denotes a database loading unit which loads the index information 1304 and database block 1303 from the storage unit 1305 into the memory 1306.

Reference numeral 1310 denotes a database retrieval unit which retrieves and extracts data corresponding to the search key 1302 from the database blocks 1303 stored in the storage unit 1305 or memory 1306; and 1311, retrieved data which is retrieved and output by the database retrieval unit 1310.

FIG. 14 is a view showing the index information 1304 in this embodiment. Reference numeral 1401 denotes an index associated with the database block 1303; and 1402, a cumulative size representing the total size of database blocks 1303 loaded into the memory up to the corresponding database block in order of priority.

Reference numeral 1403 denotes the address of the database block 1303. In this embodiment, the database blocks 1303 are sorted according to the first characters of the search keys 1302, and the character code of each first character is set as the index 1401. That is, data corresponding to search keys having the same first character are stored in the same database block. For example, data corresponding to the search key "music" are stored in a database block "m" in which only data whose first characters are "m" are stored. The index 1401 corresponding to this database block "m" is the character code "m". However, the database block sorting method and index value setting method of the present invention are not limited to those described above.

Figure 15:
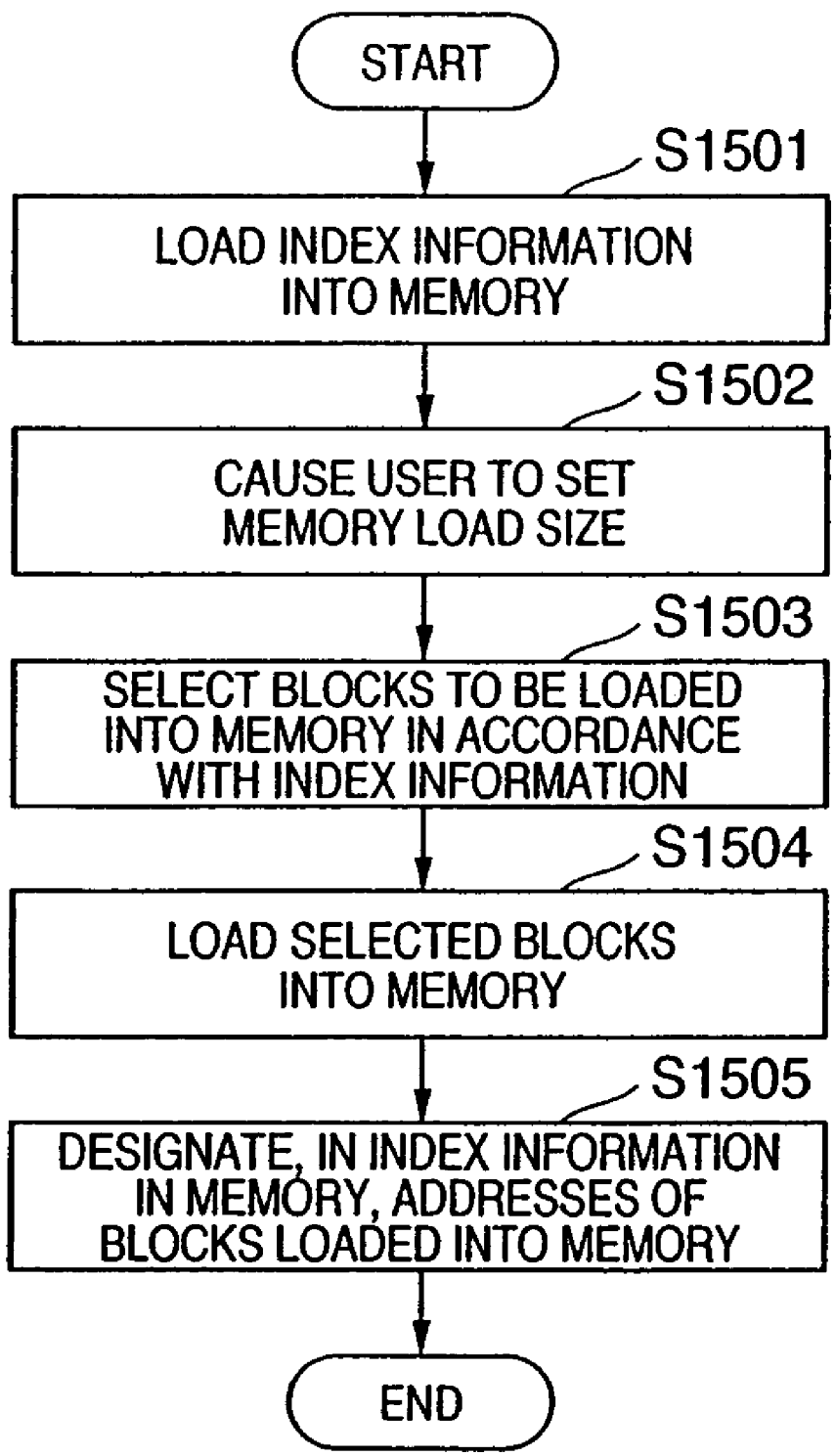
FIG. 15 is a flow chart showing a procedure for loading a database into a memory.

FIG. 15 is a flow chart showing processing of loading the database 1301 into the memory 1306 in this embodiment. The flow of processing of loading the database block 1303 into the memory 1306 will be described with reference to FIG. 15.

First of all, in step S1501, when the database retrieval apparatus is started, the index information 1304 is loaded into the memory 1306.

In step S1502, the user of the database retrieval apparatus operates the load size setting unit 1307 to set the upper limit size of database blocks 1303 to be loaded into the memory.

In step S1503, the load block determination unit 1308 selects the database block 1303 corresponding to an index whose cumulative size 1402 is equal to or less than the value set by the user by referring to the index information 1304. In step S1504, the database loading unit 1309 loads the selected database block into the memory 1306. In step S1505, the address of the database block loaded into the memory 1306 is designated as the address 1403 of the index information loaded in the memory 1306.

Figure 16:
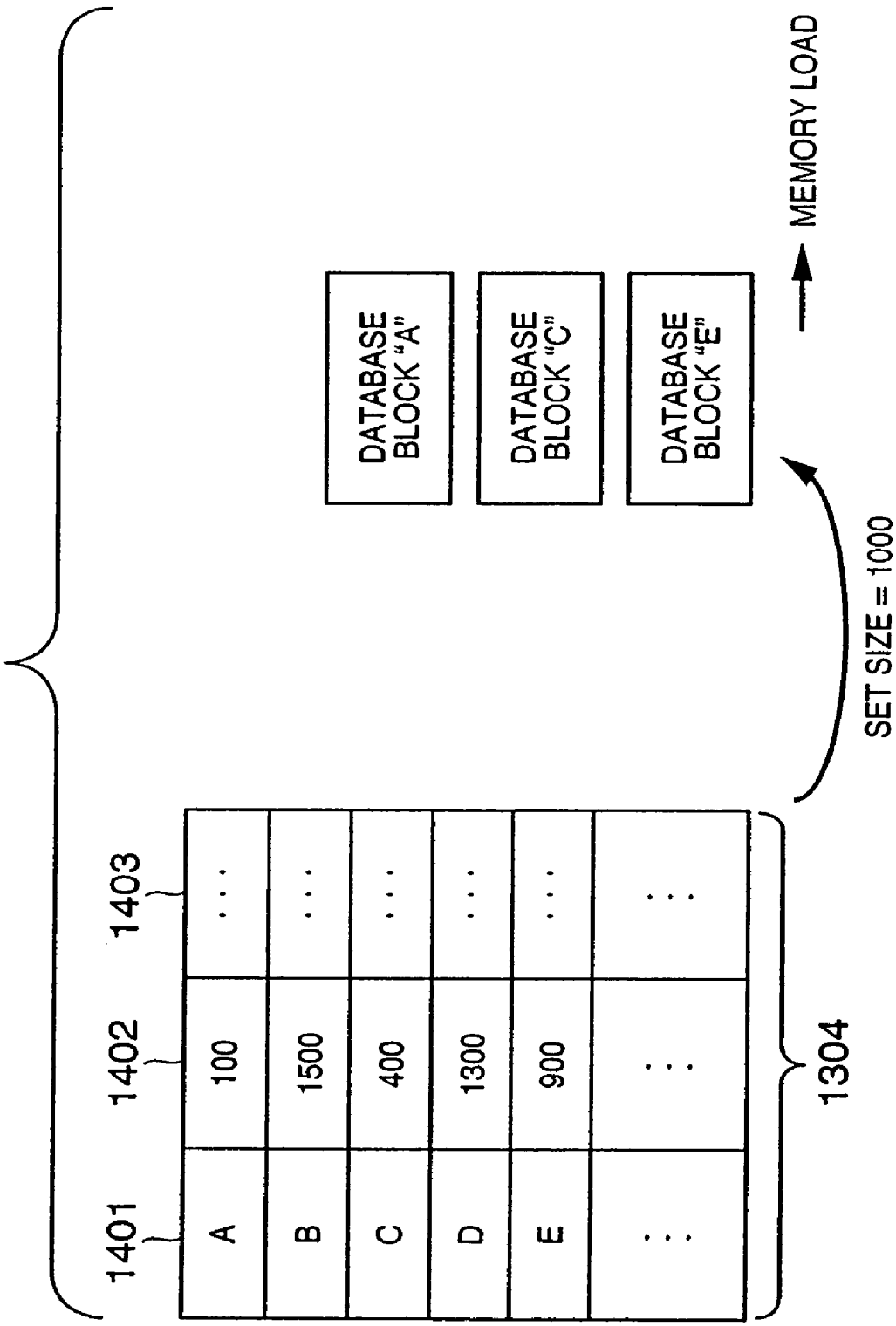
FIG. 16 is a view showing how database blocks to be loaded into the memory are selected.

FIG. 16 shows the details in steps S1502, S1503, and S1504. Referring to FIG. 16, the user sets the memory load size of database blocks to 1000. The load block determination unit 1308 scans all the indexes of the index information 1304 to select indexes whose cumulative sizes 1402 are equal to or less than the set value "1000". In the case shown in FIG. 16, indexes "A", "C", and "E" are selected because they exhibit cumulative sizes equal to or less than the set value. The database loading unit 1309 then loads database blocks corresponding to the selected indexes into the memory.

Figure 17:
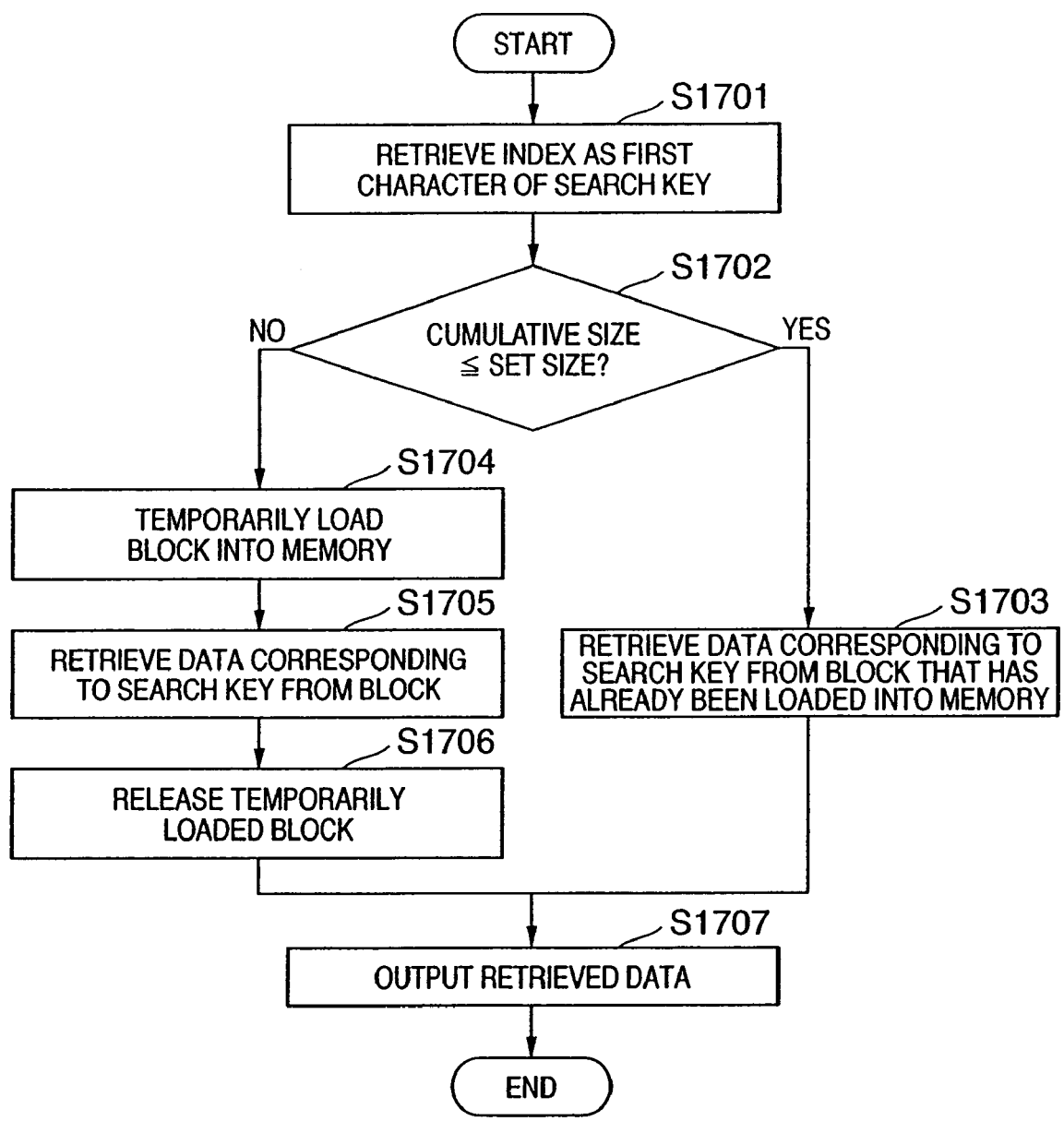
FIG. 17 is a flow chart for database retrieval.

FIG. 17 is a flow chart showing a procedure in which the database retrieval unit 1310 inputs the search key 1302 to search the database to obtain the retrieved data 1311. In step S1701, an index corresponding to a database block containing data matching the search key is retrieved from the index information 1304. In this embodiment, an index which is the first character of the search key is retrieved.

In step S1702, the cumulative size 1402 corresponding to the retrieved index is checked. If this size is equal to or less than the memory load size set by the user, since a database block storing data matching the search key exists on the memory, the database block loaded in the memory is retrieved by referring to the address 1403 in step S1703.

If the cumulative size 1402 is larger than the set memory load size, it indicates that no database block storing data matching the search key is loaded in the memory 1306. Therefore, in step S1704, the database block is temporarily loaded in the memory. In step S1705, the database block temporarily stored in the memory is retrieved. Upon completion of retrieval, the database block loaded in the memory in step S1706 is released. Finally, in step S1707, the retrieved data is output.

Figure 18:
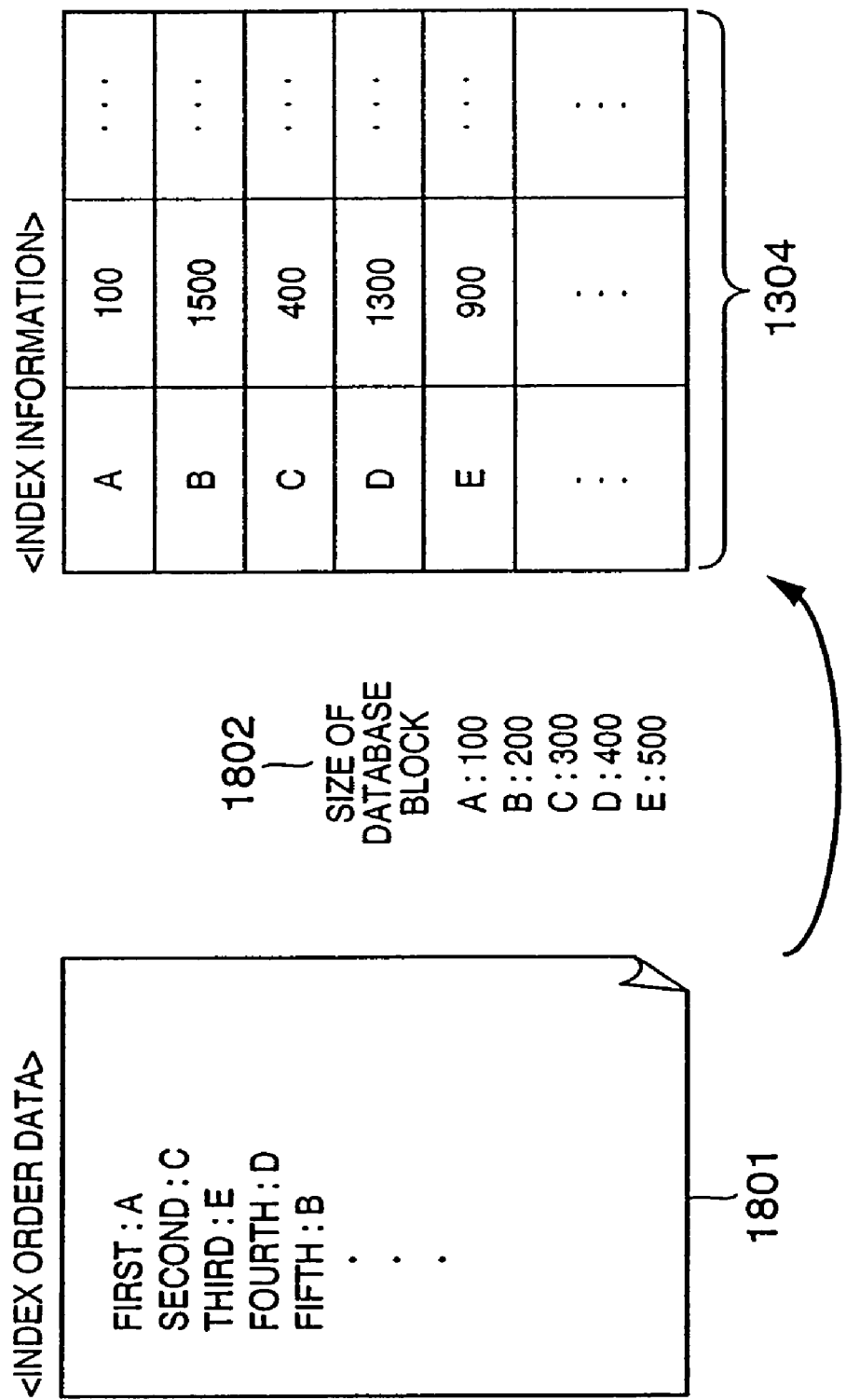
FIG. 18 is a view showing a method of setting a cumulative size within index information.

A method of determining the cumulative size 1402 will be described below. FIG. 18 is a view showing how the cumulative sizes 1402 are registered in the index information in the database. Referring to FIG. 18, reference numeral 1801 denotes index order data representing the priority level of a database block to be loaded into the memory. Index order data is obtained by counting in advance the retrieval frequency of a given database block retrieved in the database. Higher priority levels are assigned to the indexes of database blocks exhibiting higher retrieval frequencies. Reference numeral 1802 denotes the size of each database block.

The cumulative size 1402 is determined as follows. The sizes of database blocks corresponding to each index are added in decreasing order of the index order data 1801, and the sum is determined as the cumulative size 1402 corresponding to each index (For example, the index order of a database block C is second, and hence its cumulative size 1402 becomes 400 obtained by adding the size "100" of a database block A ranked first to the size of the database block C. Likewise, the cumulative size of a database block E is A+C+E; the cumulative size of a database block D, A+C+E+D, and the cumulative size of a database block B, A+C+E+D+B.)

With these settings, the database retrieval apparatus can determine, by scanning each index of index information once, which indexes it should select to load database blocks within a set size.

As described above, the retrieval speed can be maximized for each user's environment by partially loading a database in accordance with the memory size which can be prepared by the user. In addition, when the user sets a database load size in the memory, a database block can be partly loaded into the memory up to the set size. This makes it possible to quickly retrieve data from part of the database which is loaded in the memory.

In addition, loading only part of a database into the memory in consideration of the use frequencies of data instead of simply loading part of the database can greatly suppress a decrease in speed than by loading the entire database.

Seventh Embodiment

The index information in FIG. 14 in the above embodiment is not limited to this, and may take another form. For example, in the above embodiment, the cumulative sizes 1402 are held to allow the apparatus to determine, by scanning the index information once, specific indexes to be selected to load database blocks within a set size. However, the present invention is not limited to this. Index priority levels, the sizes of database blocks, and the retrieval frequencies of indexes may be held in the apparatus. In this case, indexes are extracted from the index information in order of priority or frequency order, and the corresponding database blocks are loaded until the sum of their sizes reaches a set size.

Eighth Embodiment

In the above embodiments, a database is divided into database blocks according to the first characters of data keys, and the first characters are set as the indexes 1401, thereby associating the indexes with database blocks. However, the present invention is not limited to this, and another dividing method and another association method may be used.

Ninth Embodiment

In the above embodiments, indexes are ranked in retrieval frequency order. However, the present invention is not limited to this. For example, the indexes may be ranked in character code order or ranked manually. In the above embodiments, however, loading database blocks into the memory in retrieval frequency order can increase the frequency with which database blocks in the memory can be retrieved, thus suppressing a decrease in speed as compared with a case wherein all the database blocks are loaded into the memory.

10th Embodiment

In the above embodiments, database blocks are loaded into the memory in order of priority represented by preset index order data. However, the retrieval frequencies of the respective indexes may be updated in accordance with database retrieval performed by the user to update the priority levels when block loading is performed next.

Figure 19:
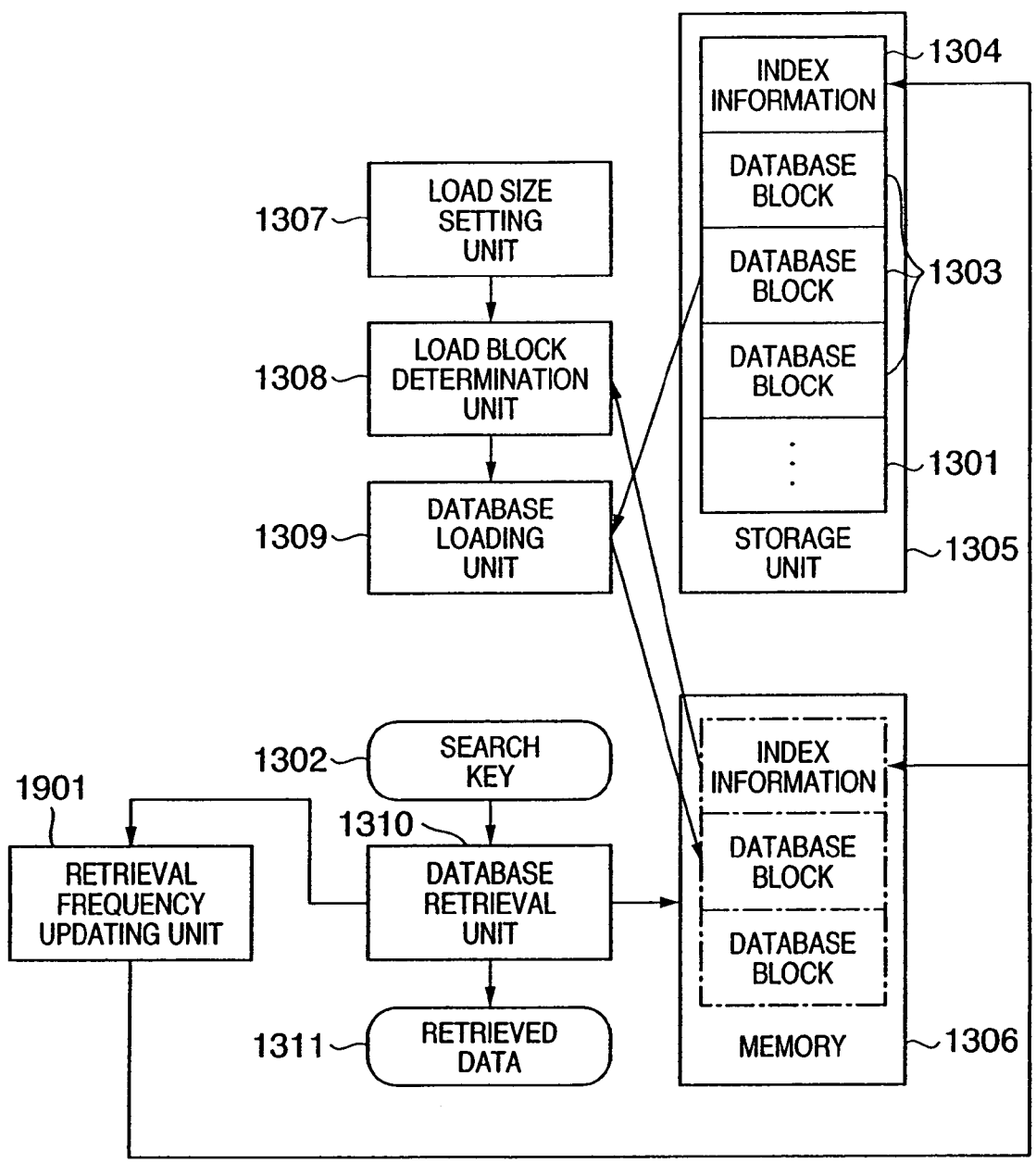
FIG. 19 is a block diagram showing the arrangement of a database retrieval apparatus according to an embodiment of the present invention.

FIG. 19 shows the arrangement of this embodiment. Reference numeral 1901 denotes a retrieval frequency updating unit which counts the retrieval frequency of the index of a database block retrieved by a database retrieval unit 1310. In this embodiment, index information 1304 is implemented in the form shown in FIG. 20. Referring to FIG. 20, reference numeral 2001 denotes a database block size corresponding to an index.

Reference numeral 2002 denotes a retrieval frequency with which a database block corresponding to an index is retrieved. When data is retrieved by the database block retrieval unit, the retrieval frequency updating unit 1901 counts the frequency of the index corresponding to the database block in which the retrieved data has been stored, i.e., counts the frequency of the first character of the search key, and updates the retrieval frequency 2002 of the index information.

The updated retrieval frequency is used when the database block is loaded into the memory next (when the database retrieval apparatus is started next or the memory is released once to reload the database block into the memory). The database loading unit 1309 loads database blocks into the memory in decreasing order of the retrieval frequencies 2002 until the total sum of database block sizes 2001 becomes equal to or less than the size set by the user.

11th Embodiment

In the above embodiments, database blocks are loaded into the memory in retrieval frequency order within a set size. However, a load block determination unit 1308 may determine a combination of database blocks to be loaded into the memory such that the total sum of the retrieval frequencies of the respective indexes becomes maximum within the size set by the user.

In this embodiment, since retrieval frequencies are required to determine database blocks to be loaded into the memory, the index information must be implemented in the form shown in FIG. 20. Referring to FIG. 20, when, for example, the size set by the user is 1000, indexes "A", "C", and "E" are loaded in retrieval frequency order. However, in order to maximize the total retrieval reception within the set size, indexes "A", "B", "C", and "D" are preferably loaded.

By selecting a combination of indexes so as to maximize the retrieval frequency, retrieval can be done faster with the same set size. Various known techniques of selecting an optimal combination are available as methods of selecting a combination so as to maximize the total retrieval frequency. One of these techniques may be used in the load block determination unit 1308.

12th Embodiment

A database retrieval apparatus according to the present invention can be used as a dictionary retrieval apparatus in morphemic analysis in natural language processing. In this case, when an input character string is input as a search key 1302 to the database retrieval apparatus, a database block in which words starting from the first character of the input character string as an index are stored is retrieved, and the data of words matching the character string are extracted.

In this embodiment, in morphemic analysis of a text, retrieval frequencies 2002 of index order data can be generated or updated by counting characters at positions, in the character strings of the text, at which the dictionary is searched.

Other Embodiment

The present invention can be applied to a system constituted by a plurality of devices, or to an apparatus comprising a single device. It is needless to say that the object of the present invention is realized even by supplying a recording medium storing software program codes for realizing the functions of the above-described embodiments to a system or apparatus, and causing the computer (or a CPU or an MPU) of the system or apparatus to read out and execute the program codes stored in the recoding medium. In this case, the program codes read out from the recording medium realize the functions of the above-described embodiments by themselves, and the recording medium storing the program codes constitutes the present invention.

As a recording medium storing such program codes, for example, a floppy (registered trademark) disk, hard disk, optical disk, magnetooptical disk, a CD-ROM, CD-R, a magnetic tape, nonvolatile memory card, a ROM, or the like can be used.

The present invention incorporates not only a case wherein the functions of the above embodiments are realized when the computer executes read program codes but also a case wherein the functions of the above embodiments are realized when the OS or the like running on the computer performs part or all of actual processing on the basis of the instructions of the program codes.

In addition, it is needless to say that the present invention incorporates a case wherein the program codes read out from the recording medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the present invention, when data corresponding to an input character strings are retrieved from a database having a trie structure, the retrieval speed can be increased.

In addition, in the database retrieval apparatus which loads a database into the memory and retrieves data from the database, an optimal database is loaded in accordance with the needs of a user to realize both high-speed database retrieval and memory-saving retrieval.

This makes it possible to realize high-speed database retrieval which is an object of the present invention.

As many apparently widely different embodiments of the present invention can be made without departing from the spirit and scope thereof, it is to be understood that the invention is not limited to the specific embodiments thereof except as defined in the appended claims.

What is claimed is:

1. A database retrieval method of performing retrieval processing for data stored in a database, characterized by comprising:
   a storage step of dividing the database into a plurality of data blocks that include character data corresponding to search keys, and storing the data blocks;
   a determination step of determining a combination of the data blocks on the basis of retrieval priority levels and data sizes of the respective data blocks such that a total sum of the data sizes of the data blocks becomes smaller than a predetermined data size set by the user;
   a loading step of loading the determined data blocks;
   a memory step of temporarily storing the loaded data blocks to perform retrieval processing for a database of the loaded data blocks; and
   an output step of outputting data having undergone retrieval processing
   wherein each data block has corresponding index information, and the plural index information are sorted based on the retrieval priority levels of the corresponding data blocks, and
   wherein in the determination step, a combination of the data blocks is determined on the basis of the plural index information, each index information having a cumulative data size obtained by adding the data size of the corresponding data block to a total sum of data sizes of data blocks higher in priority level than the corresponding data block.

2. A computer-readable storage medium storing a computer-executable control program for causing a computer to realize a database retrieval method defined in claim 1.

3. A database retrieval method of performing retrieval processing for data stored in a database, the method comprising:
   a storage step of dividing the database into a plurality of data blocks that include character data coffesponding to search keys, and storing the data blocks;
   a determination step of determining a combination of the data blocks on the basis of retrieval priority levels and data sizes of the respective data blocks such that a total sum of the data sizes of the data blocks becomes smaller than a predetermined data size set by the user;
   a loading step of loading the determined data blocks;
   a memory step of temporarily storing the loaded blocks to perform retrieval processing for a database of the loaded data blocks; and
   an output step of outputting data having undergone retrieval processing,
   wherein each data block has corresponding index information, and the plural index information are sorted based on the retrieval priority levels of the corresponding data blocks, and
   wherein in the determination step, a combination of the data blocks is determined on the basis of the plural index information, each index information having a priority level, a data size, and a retrieval frequency of the corresponding data block.

4. A computer-readable storage medium storing a computer-executable control program for causing a computer to realize a database retrieval method defined in claim 3.

5. A database retrieval apparatus which performs retrieval processing for data stored in a database, the apparatus comprising:
   storage means for dividing the database into a plurality of data blocks that include character data coffesponding to search keys, and storing the data blocks;
   determination means for determining a combination of the data blocks on the basis of retrieval priority levels and data sizes of the respective data blocks such that a total sum of the data sizes of the data blocks becomes smaller than a predetermined data size set by the user;
   loading means for loading the determined data blocks;
   a memory for temporarily storing the loaded data blocks to perform retrieval processing for a database of the loaded data blocks; and
   output means for outputting data having undergone retrieval processing,
   wherein each data block has corresponding index information, and the plural index information are sorted based on the retrieval priority levels of the corresponding data blocks, and
   wherein said determination means determines a combination of the data blocks on the basis of the plural index information, each index information having a cumulative data size obtained by adding the data size of the corresponding data block to a total sum of data sizes of data blocks higher in priority level than the corresponding data block.

6. A database retrieval apparatus which performs retrieval processing for data stored in a database, the apparatus comprising:
    storage means for dividing the database into a plurality of blocks that include character data coffesponding to search keys, and storing the blocks;
    determination means for determining a combination of the data blocks on the basis of retrieval priority levels and data sizes of the respective data blocks such that a total sum of the data sizes of the data blocks becomes smaller than a predetermined data size set by the user;
    loading means for loading the determined data blocks;
    a memory for temporarily storing the loaded data blocks to perform retrieval processing for a database of the loaded data blocks; and
    output means for outputting data having undergone retrieval processing,
    wherein each data block has corresponding index information, and the plural index information are sorted based on the retrieval priority levels of the corresponding data blocks, and
    wherein said determination means determines a combination of the data blocks on the basis of the plural index information, each index information having a priority level, a data size, and a retrieval frequency of the corresponding data block.

* * * * *